Aug. 12, 1969  A. A. BUSQUETS  3,460,568
MIXING AND DIVERTER WATER VALVE
Filed Dec. 19, 1966
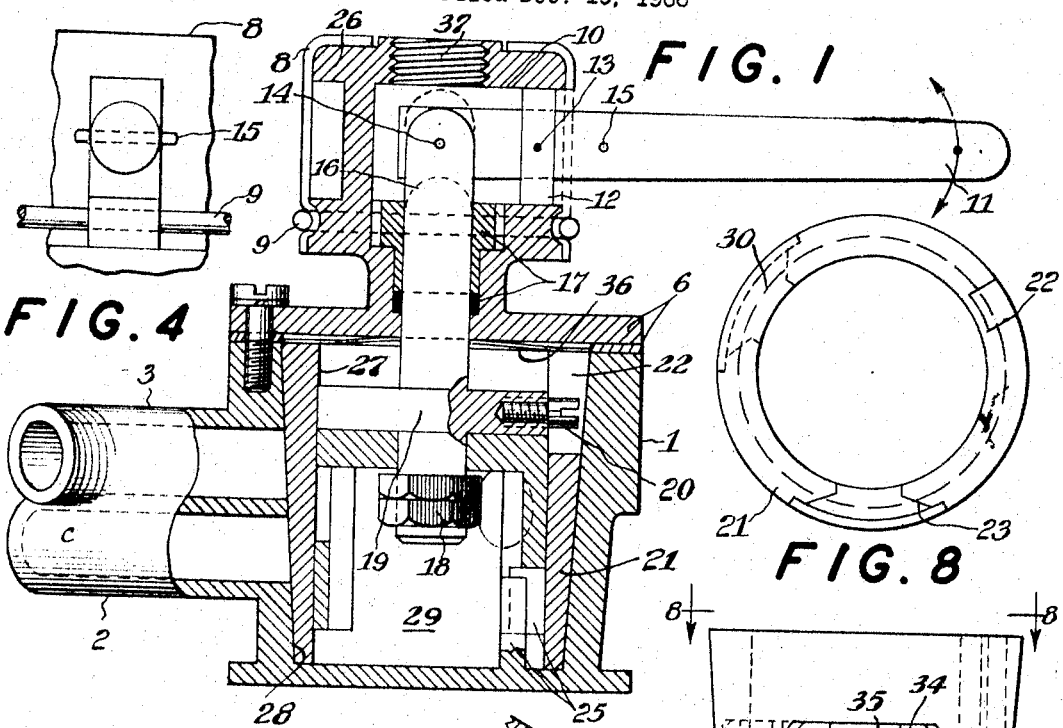
FIG. 1
FIG. 4
FIG. 8
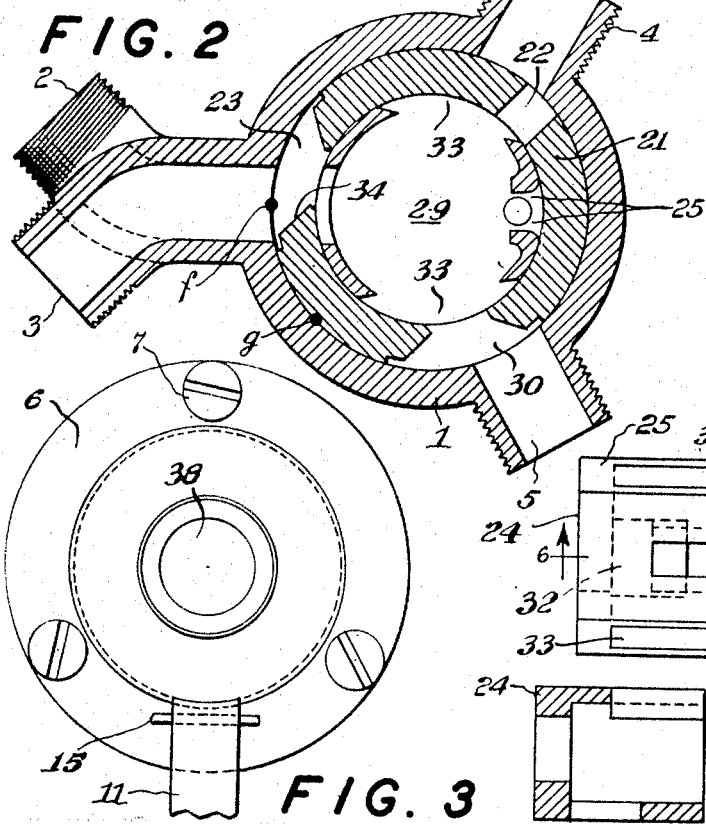
FIG. 2
FIG. 3
FIG. 9
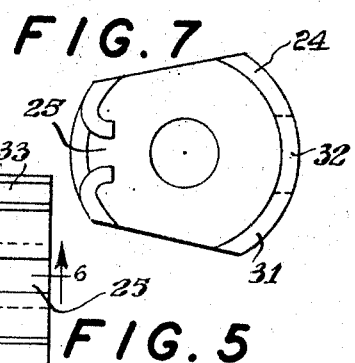
FIG. 7
FIG. 5
FIG. 6
INVENTOR.
AGUSTIN A. BUSQUETS

United States Patent Office 3,460,568
Patented Aug. 12, 1969

3,460,568
MIXING AND DIVERTER WATER VALVE
Agustin A. Busquets, 404 Virginia, Apt. 6,
Royal Oak, Mich. 48067
Filed Dec. 19, 1966, Ser. No. 602,838
Int. Cl. F16k 5/02, 31/44, 5/10
U.S. Cl. 137—597                           2 Claims

ABSTRACT OF THE DISCLOSURE

A hot and cold water control and mixing valve having a body with a tapered bore with vertically spaced hot and cold water inlets on one side and bathtub and shower outlets on the other side, an outer open ended tapered valve rotative in said bore and having a pair of vertically spaced inlet ports and an angularly displaced pair of vertically spaced outlet ports, for cooperative variable registry with said inlets respectively and with one of said outlets, the inlet ports and outlet ports adapted for reversible connection respectively with said inlets and outlets, a second tubular valve axially movable within the first valve open at one end defining a mixing chamber therein and having a side inlet port for selective cooperative registry with the outer valve inlet ports and the body inlets; and including a pair of opposed outer ports registrable with the said outer valve outlet ports and one of the body outlets, a longitudinally movable and rotatable stem journaled on the inner valve and connected thereto for relative rotary movements, a cap closing the body including a nipple receiving the stem, the nipple having a lateral side opening, a fulcrum laterally movable in said side opening and a lever arm pivoted to the fulcrum intermediate its ends and at one end pivoted to the stem.

---

It is an object of this invention to provide a mixing valve adapted to receive water from separate hot and cold water sources and to deliver same to a selected one or two alternative outlets, as for example, bathtub and bathtub shower outlets.

Another object is to provide a control lever which selects the outlets for use and at the same time controls the volume of flow and the temperature of the water discharged from this outlet.

Another object is to provide a control lever that may be moved in horizontal and vertical planes.

Another object is to provide a mixing valve, a means for selecting the volume of discharge and means for changing the temperature without changing such preselected volume, or alternately, to modify the volume without changing the temperature.

These and other objects and advantages will be seen in the following specification and claims in conjunction with the accompanying drawings in which:

FIG. 1 is a vertical section of the mixing valve.

FIG. 2 is a horizontal section thereof.

FIG. 3 is a fragmentary plan view of the mixing valve.

FIG. 4 is a fragmentary partly broken away elevational view of the valve cover.

FIG. 5 is an elevational view taken from one side of the inner valve of FIG. 2.

FIG. 6 is a section taken in the direction of arrow 6—6 of FIG. 5.

FIG. 7 is a bottom plan view of the inner valve viewed as if rotated 180° from the position shown in FIG. 2.

FIG. 8 is a plan view of the outer valve taken in the direction of arrows 8—8 of FIG. 9.

FIG. 9 is an elevational view of the outer valve.

Referring to the drawing, FIGS. 1 and 2 illustrate the cast valve body 1 which is formed to provide the vertically alined cold water inlet 2 and hot water inlet 3, exteriorly or interiorly threaded for connection respectively to sources of cold and hot water respectviely.

The body is also formed with a pair of outwardly extending shower and tub outlets 4 and 5 respectively whose diameters are larger than the diameters of the inlets 2 and 3.

The hollow body of the valve is open at its top and closed at the bottom. The body is closed by the cover and gasket assembly 6 retained by the fasteners 7, FIG. 3.

The cup-shaped cover 8 is rotatively mounted upon the hollow nipple 26 which forms a part of the cover and is retained thereon by the retaining ring 9 which mounts a lower annular groove portion within a corresponding annular groove in said nipple, FIG. 1 and FIG. 4.

Said nipple includes a laterally elongated side opening 10 into which projects one end of the control lever 11.

The generally rectangular fulcrum 12 is mounted in an upright position within side opening 10 and adapted for lateral movements therein. The fulcrum 12 is suitably slotted to receive therethrough an intermediate portion of lever 11 pivoted thereto at 13. The inner end portion of the lever is pivoted at 14 to the upper end of the commando stem 16 which projects up into the hollow portion of said nipple.

Transverse indicator pin 15, FIGS. 1 and 3, projects from portions of lever 11 adapted for registry with suitable indicia upon the cover or nipple to designate various rotative positions of lever 11 in a horizontal plane. For example, in the central position of lever 11 fragmentarily shown in FIG. 3, the valve is in an OFF position and closed and when rotated to extreme positions from the right or left of the position shown in FIG. 3, provides for maximum volume of flow through one or the other of the respective shower or tub outlets 4 or 5.

A suitable seal and nut assembly 17 extends around commando stem 16 and is adjustably mounted within the lower portion of the nipple adjacent the cover to seal off the interior of the valve body.

The lower end of the stem 14 includes a disc 19 which bears against the inner cylindrical valve 24 and is movably positioned within the cylindrical bore 27 of the outer tapered valve 21.

The outer surface of the tapered valve has an exterior taper for cooperative sealing registry with the internal tapered bore 28 of the valve body.

The stem 16 extends through the disc 19 and loosely through the top of the inner valve 24 and is secured thereon by the lock nuts 18 which are located within the mixing chamber 29 of the inner valve 24.

This disc 19, FIG. 1, has a laterally extending bore within which is threaded the taper headed screw 20 whose tapered head is positioned for longitudinal movements within the tapered slot 22 formed within the upper portion of the outer tapered valve 21.

By this construction, rotary movement of the lever 11 and its fulcrum 12 within the side opening slot 10 of the nipple effects a corresponding rotation of the stem 16 about its central axis and through the headed pin 20 effects a corresponding rotary movement of the tapered valve 21 for the purpose hereafter set forth in regulating the volume of flow of hot and cold water or a mixture thereof into the mixing chamber 29.

The inner valve 24 is slotted at 25 and is adapted to receive a stationary pin which forms a part of or is connected to the interior of the valve body for relative movements so as to limit the inner valve to longitudinal reciprocal or vertical movements within the bore of the tapered valve.

Thus the inner valve is restrained against rotary movement.

The tapered valve 21 is normally of a height slightly less than the height of the internal bore of the valve body and a convex spring 36, FIG. 1, is interposed between cover 6 and the tapered valve normally biasing the same for suitable self-seating with respect to the tapered internal bore 28 of the valve body.

This provides a means by which, as some relative wear occurs, the internal rotary valve 21 is properly seated in sealing relation with respect to the internal bore of the valve body.

As shown in FIGS. 2 and 8 formed through the wall of the outer tapered valve are a pair of vertically spaced inlet ports 23 which are normally in registry in a horizontal plane with respective water inlets 2 and 3 and by relative rotation of the tapered valve 21 variably regulate volume of water flowing through the respective inlets 2 and 3.

Angularly displaced from the inlet ports 23 are a second pair of vertically spaced outlet ports 30, FIGS. 2 and 8, which as shown in FIG. 2 are in registry with the bathtub outlet 5 during the period that the inlet ports 23 are in registry with the two inlets 2 and 3, FIG. 2.

The angular spacing between the inlet and outlet ports 23 and 30 is such that upon rotation of the tapered valve 21 through an arc, the respective outlet ports 30 in said valve will be reversed in positioning with respect to the inlet ports 23 so that the two ports 30 will serve as inlet ports and at the same time the previously referred to inlet ports 23 will be in registry with the shower outlet 4 and thus serve as outlet ports.

The respective ports 23 and 30 are in lateral alinement horizontally with respect to the inlets 2 and 3 and are of a height approximating the diameter of the inlets 2 and 3.

The positioning of the inlet ports 23 with respect to the inlets 2 and 3, FIG. 2, illustrates one extreme position approximately of the lever 11 when rotated in a horizontal plane with respect to the nipple side opening 10. Additionally, rotation of the tapered valve to a second position so that the ports 30 are in registry with the inlets 2 and 3 causes a positioning of the ports 23 in registry with the shower outlet 4 corresponding to a second extreme positioning of the lever 11 in a horizontal plane.

The respective ports 23 and 30 on the exterior of the tapered valve are largest and are generally of oval shape, FIG. 9, but are chamfered or tapered at 34 and terminate in the inner rectangular openings 35 for regulating the flow of water through the inlets 2 and 3 through the inlet 32 of the inner valve 24 as hereafter described.

The inner cylindrical valve has a pair of opposing cylindrical surfaces 31, FIG. 7, adapted for sliding registry within the cylindrical bore 27 of the tapered valve and includes a side inlet 32 of rectangular shape or square such as shown in FIGS. 5 and 6 adapted for variable registry with the respective water inlets 2 and 3 depending upon the vertical positioning of valve 24.

In the central positioning of lever 11, FIG. 1, the longitudinally adjustable inner valve 24 is in a central position so that equal amounts of hot and cold water are passing through the inlet 32 into the mixing chamber 29 of the inner valve and through the respective inlet ports 23.

The inlet 32 is adapted to overlie and be in registry with equal portions of the inlets 2 and 3 and upon vertical adjustment either the hot or cold water can be turned off or variably modulated to achieve a mixing action of the inletted fluids into the mixing chamber 29.

A locating point $f$ is shown in FIG. 2 and a relative locating point is shown at $g$ with respect to the rotative outer valve 21. When these two points are in registry the valve would be in a closed position so that there is no flow therethrough.

As shown in FIG. 1 and FIG. 3, the nipple 26 has a central threaded aperture 37 adapted to receive a stop plug 38, FIG. 3, and thus limit upward movements of the stem 14 and in turn the maximum amount of hot water flow into the mixing chamber.

With the lever 11 moved to a central position so that the points $f$ and $g$ of FIG. 2 are in registry, the valve is regarded as closed. So closed, it is difficult to move the lever 11 up and down because any longitudinal movement of the cylindrical inner valve produces either a vacuum or an increased pressure condition within the mixing chamber. In other positioning of the lever 11 in a horizontal plane which communicates the mixing chamber in variable amounts with the outlet 4 or 5, communication is established with atmosphere and thus the lever 11 may be more easily moved up and down.

As the lever 11 is moved towards one end of the support slot 10, the flow of water to the mixing chamber increases and reaches a maximum when its movement is limited at the end of the slot.

Thus with rotational movement of lever 11, it is possible to obtain variation of the water flow from the minimum to the maximum by movements of the lever 11 in a horizontal plane from such extreme position back to the central closed position and on continued movement in the same direction towards the other extreme position can gradually increase the flow to a maximum with respect to the other outlet.

Axial movements of the cylindrical valve change the proportions between the cold water and the hot water and there will be an intermediate temperature of mixed water when the lever 11 is in the central position shown in FIG. 1 and in other positions will variably control the mixing of the hot and cold water, and in the maximum positions flow of either hot water or cold water as desired.

Movement of the cylindrical valve upward to its maximum position provides for a maximum temperature since the cylindrical valve inlet 32 is in sole registry with the hot water inlet 3. This maximum temperature may be controlled by the threaded plug 38 within the nipple 26, FIGS. 1 and 3.

Having described my invention, reference should now be had to the following claim.

I claim:
1. A fluid mixing valve comprising:
   a hollow generally cylindrical vertically arranged valve body closed at one end and having an axially and rotatably movable control stem extending through a seal in the oposite end, said body having two axially spaced inlet ports and an outlet port;
   a first valve sleeve rotatably mounted in the bore of said body and being normally non-movable in the axial direction, said first sleeve having a pair of axially spaced and aligned inlet ports and an outlet port;
   first connecting means for transmitting rotary motion of said stem to said first valve sleeve;
   a second valve sleeve slidably mounted for axial movement in the bore of said first valve sleeve and being non-rotatable relative to said valve body, said second sleeve being provided with an inlet port and an outlet port angularly spaced therefrom, said second valve sleeve inlet port being angularly aligned with and overlapping said valve body inlet ports, said second valve sleeve outlet port being angularly aligned with said valve body outlet port, and the bore of said second valve sleeve defining a mixing chamber;
   second connecting means for transmitting axial motion of said stem to said second valve sleeve;
   rotation of said control stem regulating the degree of registry of said first valve sleeve inlet ports with said valve body inlet ports and with said second valve sleeve inlet port to control the volume of fluid admitted to said mixing chamber;
   axial displacement of said control stem regulating the degree of registry of said second valve sleeve inlet port with said valve body inlet ports to control the proportion of fluid mix admitted from said valve body inlet ports to said mixing chamber;
   and the volume and mix regulated fluid in said mixing chamber exiting via said outlet ports in said first and second valve sleeves and said valve body.

2. The valve of claim 1, wherein said valve body has a pair of angularly spaced outlet ports and said outlet port of said first valve sleeve comprises a pair of axially spaced and aligned outlet ports angularly offset from said pair of first sleeve inlet ports, said pairs of inlet and outlet ports being interchangeable for use either as inlet or outlet ports depending upon their angular position as controlled by said stem, and wherein said second valve sleeve has a pair of angularly spaced outlet ports angularly aligned and overlapping respectively said pair of body outlet ports;

whereby rotation of said control stem further serves to select which of said valve body outlet ports receives the volume and mix regulated fluid from said mixing chamber by aligning one of said pairs of axially spaced and aligned ports in said first sleeve with said valve body inlet ports and further aligning the other of said pairs of axially spaced and aligned ports in said first sleeve with a selected one of said valve body outlet ports.

References Cited

UNITED STATES PATENTS

| | | | |
|---|---|---|---|
| 1,496,584 | 6/1924 | McCrink | 137—597 XR |
| 2,563,955 | 8/1951 | Pearse | 137—597 |
| 3,245,430 | 4/1966 | Enterante | 137—597 XR |
| 1,943,865 | 1/1934 | Hennessey | 137—625.17 |
| 2,456,078 | 12/1948 | Paille | 137—636.4 XR |
| 3,348,561 | 10/1967 | MacLennan | 137—636.4 XR |

FOREIGN PATENTS 505,817   5/1920   France.

WALTER A. SCHEEL, Primary Examiner

ROBERT I. SMITH, Assistant Examiner

U.S. Cl. X.R.

137—614